(12) United States Patent
Bear

(10) Patent No.: US 6,676,509 B1
(45) Date of Patent: Jan. 13, 2004

(54) SIMULATION OF RACECAR WHEEL-CHANGING OPERATION BY PIT CREWMAN

(76) Inventor: Richard Bear, 4270 Witherow Rd., Winston-Salem, NC (US) 27106

(*) Notice: Subject to any disclaimer, the term of this patent is extended or adjusted under 35 U.S.C. 154(b) by 624 days.

(21) Appl. No.: 09/628,976

(22) Filed: Jul. 31, 2000

(51) Int. Cl.$^7$ ................................................ A63F 13/00
(52) U.S. Cl. ........................................... 463/7; 434/219
(58) Field of Search ........................ 463/7, 46; 434/219

(56) References Cited

U.S. PATENT DOCUMENTS 1,879,304 A * 9/1932 Kennedy et al. ............ 414/463
5,823,408 A * 10/1998 Kim ......................... 224/42.21

OTHER PUBLICATIONS

Toronto race gear up to test their pit crew skills at the budweiser ultimate pit crew challenge, Canada Newswire; Ottawa, Jul. 10, 1999.*
Drawing and photographic document entitle "Tire Change Chalenge"; before Jul. 31, 1999.
Photographic document entitled "Dual Wheel Tire Change Apparatus"; before Jul. 31, 1999.

* cited by examiner

*Primary Examiner*—John Hotaling, II
(74) *Attorney, Agent, or Firm*—Kennedy Covington Lobdell & Hickman, LLP

(57) ABSTRACT

An apparatus for performing a wheel-changing simulation has a mount, a support connected to the mount, and a wheel hub retained on the support. The support moves relative to the mount between a retracted position and an extended position. The hub is located adjacent the mount for securement thereto when the support is in the retracted position, and is located remote from the mount when the support is in the extended position. A method for simulating a wheel-changing operation on a racecar by a member of a pit crew includes the steps of unfastening and removing a wheel hub from a mount, returning and refastening the wheel hub to the mount, and constantly supporting the hub throughout the aforesaid steps. In accordance with one feature, the hub is constantly supported by attaching the hub to a support that is connected to and moves relative to the mount. In another feature, the hub is constantly supported such that an axis of the hub remains in fixed orientation relative to the mount.

27 Claims, 13 Drawing Sheets

CLOCK STOPS
RED LIGHT ON

SIMULATION OF RACECAR WHEEL-CHANGING OPERATION BY PIT CREWMAN

FIELD OF THE PRESENT INVENTION

The present invention relates to an apparatus and method of entertainment and, in particular, to a game that simulates the wheel-changing operation on a racecar by a member of a pit crew.

BACKGROUND OF THE PRESENT INVENTION

Stock car racing is an ever increasingly popular sport. As interest in this sport continues to grow, interest in games relating to stock car racing also grows. In this regard, a game has been developed for simulating the wheel-changing operation on a racecar by a member of a pit crew, whereby participants compete by comparing each participant's elapsed time required to complete a wheel change.

At least two apparatus each of which simulates the wheel-changing operation on a racecar by a member of a pit crew are known. Each apparatus includes a full-size racing wheel that is secured to a mounting plate. The mounting plate includes five studs that extend perpendicularly therefrom through corresponding openings provided in the hub of the wheel. Lugs carried on the hub screw on the studs and secure the wheel hub to the mount. The mounting plate itself is attached to and forms part of a showcase. A chronograph is provided for measuring the elapsed time of each simulation. A free standing post with button for starting and stopping the chronograph is also provided and positioned in front of the showcase.

The wheel is dismounted from the mounting plate by loosening of the lugs with a wrench, which may be either an air wrench or an electric wrench. Other than the securement of the wheel hub to the mounting plate by the lugs, the wheel is otherwise unattached to anything and is supported only by the studs when on the mounting plate, and when removed from the studs of the mounting plate, the wheel is unsupported by the apparatus. Furthermore, after loosening of the lugs and dismounting and removal of the wheel, the wheel is placed on and rolled along the ground by the participant in front of the showcase.

In one of the apparatus, a vertically disposed pressure pad also is located in front of the showcase, and the wheel is rolled into the pressure pad to trigger activation of a light located on in the front wall of the showcase. In the other apparatus, the tire is merely rolled on the ground and no pressure pad is provided with no corresponding activation of a visual signal.

In either apparatus, the wheel must be lifted by the participant during mounting and dismounting of the wheel from the studs of the mounting plate. However, the wheel itself weighs approximately 75 lbs. Consequently, as the wheel must be lifted by a person performing the simulation, both when dismounting and mounting from the mounting plate, only those persons capable of easily lifting the wheel are able to enjoy the simulation. Additionally, because of the extreme weight of the wheel, the wheel is mounted near ground level to minimize the distance that the wheel must be lifted by the participant. This results in the adverse condition that the participant must stoop down or support oneself on a knee when performing the simulation. This can lead to back injury as well as soil the clothing of the participant.

Consequently, a need exists for an apparatus that simulates the wheel-changing operation on a racecar by a member of a pit crew which can be universally enjoyed by anyone without regard to size, strength, or injury liability.

SUMMARY OF THE PRESENT INVENTION

Briefly described, the present invention includes an apparatus for performing a wheel-changing simulation having a mount, a support connected to the mount, and a wheel hub retained on the support. The support moves relative to the mount between a first, retracted position and a second, extended position. The hub is located adjacent to the mount for securement thereto when the support is in the first position thereof, and is located remote from the mount when the support is in the second position thereof.

In a preferred embodiment, the mount comprises a planar mounting plate with studs extending therefrom and the support comprises an elongate bar. A bearing housing slidably supports the bar, and the mount is affixed to the bearing housing and defines an opening through which the bar slidably extends perpendicular to the mounting plate. A wheel includes the hub which is affixed to an end of the bar in coaxial relation therewith. The hub rotates relative to the mount and, preferably, is fixed against movement relative to the bar (alternatively, the hub rotates on the bar). The hub further defines openings through which the studs of the mounting plate extend when the bar is in the retracted position. The mount thereby abuts the hub to inhibit rotation of the hub when the bar is in the retracted position. Additionally, lugs are carried on the hub by springs and engage the studs of the mount to secure the hub to the mounting plate when the bar is in the retracted position.

This preferred embodiment also includes a showcase to which the bearing housing is connected for support of the entire assembly therein. The showcase includes a front wall having a recess in which the wheel is located when the bar is in the retracted position, and another recess in which an air wrench is stored. The air wrench is used to loosen and tighten the lugs on the studs when removing the wheel from and returning the wheel to the mount, respectively. The showcase further includes a switch that is tripped by the bar when it moves toward the extended position, and a switch that is tripped when the air wrench is removed from and returned to the recess. The showcase also includes a chronograph for measuring and displaying the elapsed time of the simulation, and rollers affixed to a wall thereof for ease of mobility of the showcase.

The present invention also comprises a method for simulating a wheel-changing operation on a racecar by a member of a pit crew, including the steps of unfastening and removing a wheel hub from a mount, returning and refastening the wheel hub to the mount, and supporting the hub throughout the aforesaid steps. In accordance with one feature of the present invention, the hub is constantly supported by attaching the hub to a support that is connected to and moves relative to the mount. In another feature, the hub is constantly supported such that an axis of the hub remains in fixed orientation relative to the mount.

BRIEF DESCRIPTION OF THE DRAWINGS

Further features, embodiments, and advantages of the present invention will become apparent from the following detailed description with reference to the drawings, wherein.

DETAILED DESCRIPTION OF A PREFERRED EMBODIMENT

Figure 1:
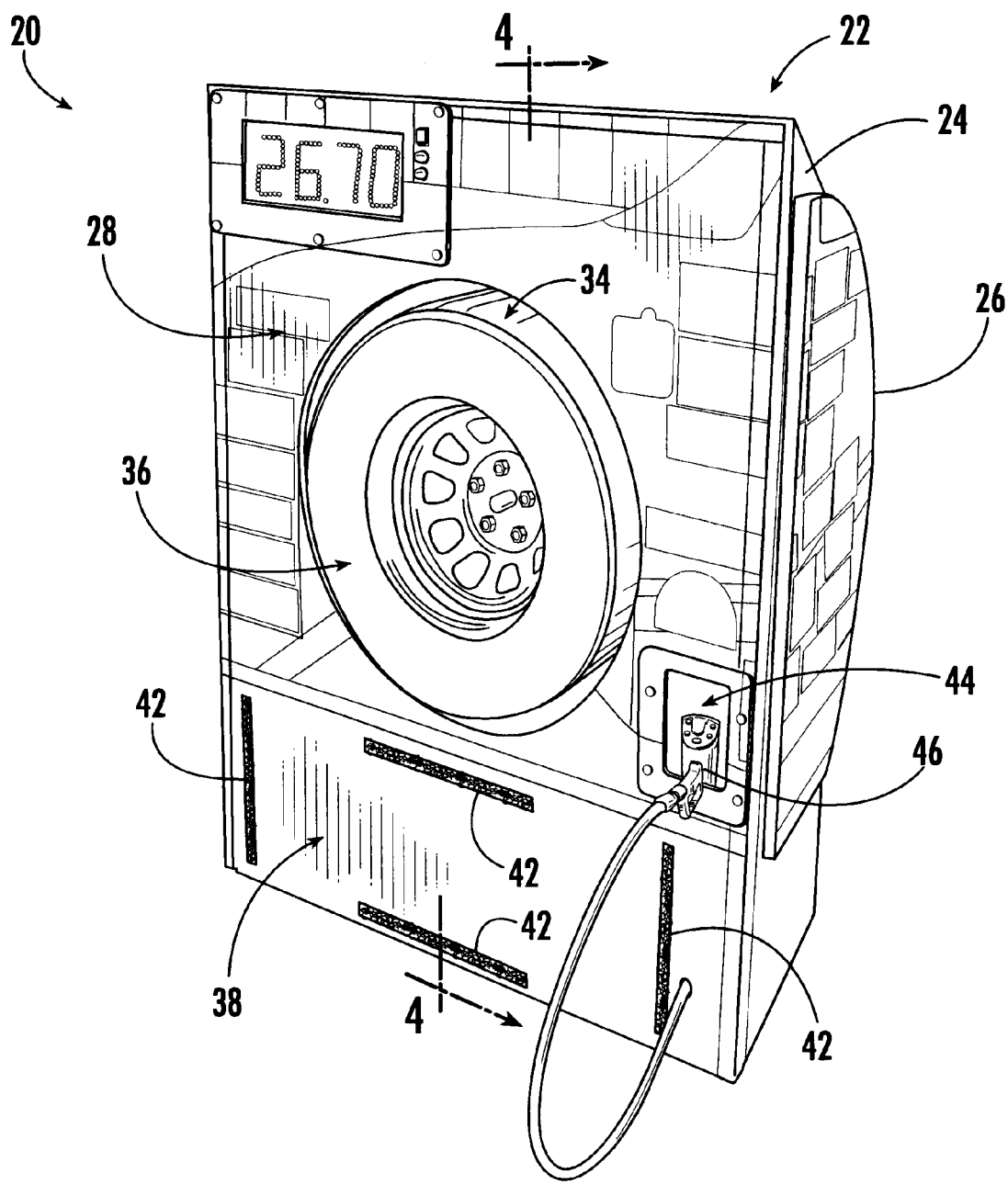
FIG. 1 is a perspective view of the preferred apparatus of the present invention.

With primary reference to FIGS. 1–5, a preferred embodiment 20 of the present invention will now be described in detail.

The preferred embodiment 20 includes a showcase 22 having front, rear, side, and top walls defining an enclosure. Each of the side walls 24 includes an extension wall 26 pivotally mounted for movement between a folded position flush with the respective side wall 24, and an unfolded position flush with the front wall 28. Rods 30 maintain the unfolded position of the extension walls 26. In conjunction therewith, the two extension walls 26 and the front wall 28 define a surface 32 having a design that resembles a racecar when the extension walls 26 are unfolded. The front wall 28 also defines a recess 34 in which a wheel 36 is located to correspond with the wheel of the racecar depicted in the surface 32 of the extension and front walls 26,28.

In addition to the racecar depicted in the extension and front walls 26,28, the front wall 28 also preferably includes an additional space 38 in which advertisement, such as for a sponsor of the showcase 22, is displayed. In the preferred embodiment 20, the advertisement comprises a board 40 that is attached with hook-and-loop type fasteners 42 to the additional space 38 of the front wall 28.

Figure 6:
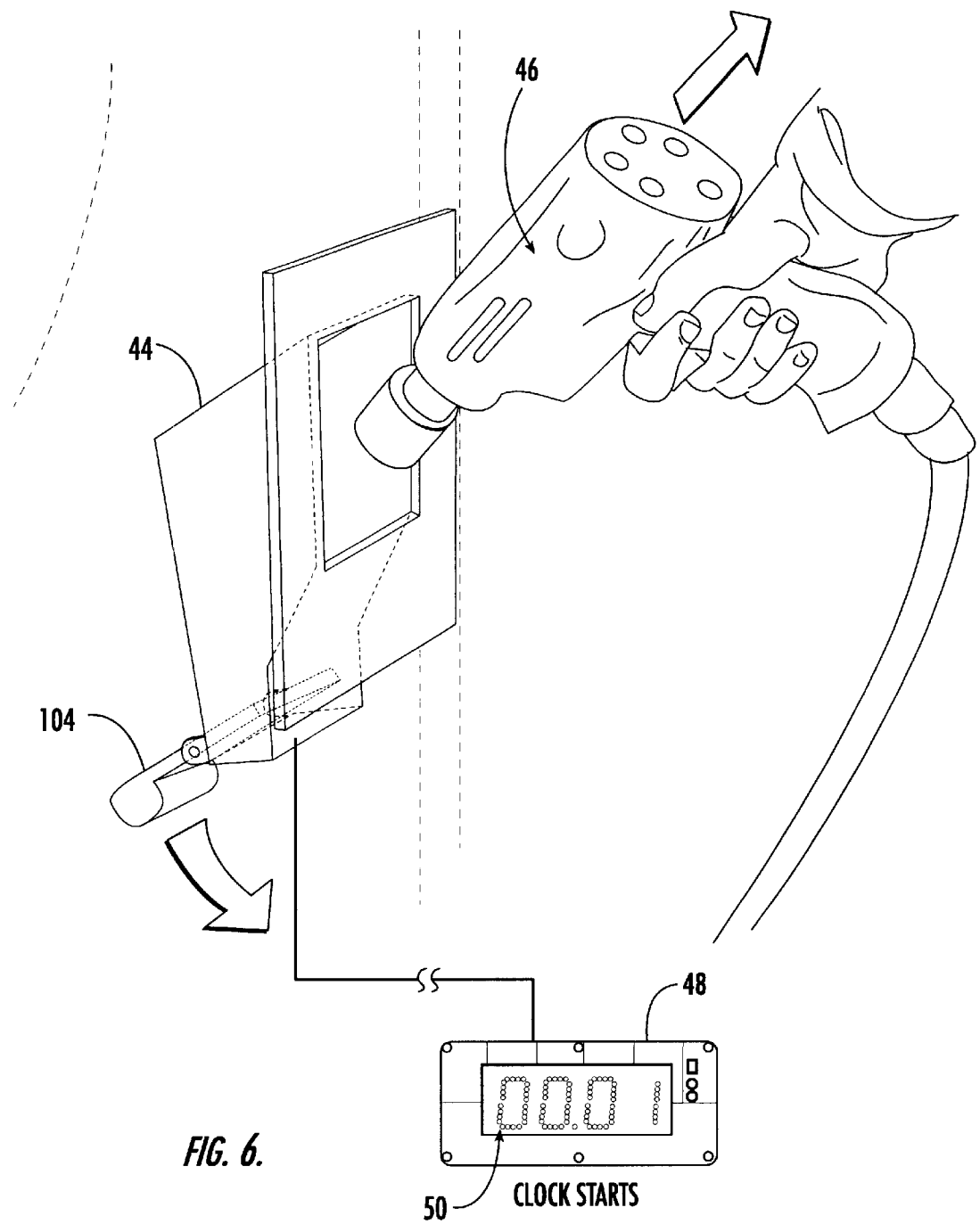
FIG. 6 is a perspective view of part of the apparatus of FIG. 1 illustrating a step in the simulation of the present invention.

The showcase 22 includes another recess 44 in which an air wrench 46 is stored. A chronograph 48 (see FIG. 6) is also included having a display 50 located in the front wall 28 for viewing from the front of the showcase 22. The rear wall 51 of the showcase 22 includes rollers 52 by which the showcase 22, once tilted using a handrail 53, is easily transported as a single unit for mobility thereof. An electrical cord 55 and compressed air hookup 57 are also provided at the rear wall 51.

Located within the showcase 22 is the assembly for performing the simulated wheel change. In particular, a mounting bracket 54 secures a cylindrical housing 56 with bearings 58 within the showcase 22. A support comprising an elongate bar 60 extends through and is retained within the bearing housing 56 for linear sliding movement therein between a retracted position and an extended position. A mount 62 comprising a planar mounting plate 64 is fixedly attached to the bearing housing 56 at an end 68 thereof, and the mounting plate 64 includes an opening 70 through which the bar 60 slidably extends perpendicularly thereto. The mounting plate 64 further includes studs 66 which extend through the mounting plate 64 and are affixed thereto by set screws 67.

The bar 60 includes opposed threaded ends 72,74 each having a diameter less than a portion 76 of the bar 60 extending between the opposed ends 72,74. Supported on the rear end 72 of the bar 60 is a rubber bumper 78 and a trigger plate 80 retained thereon by an end nut 82. Supported on the front end 74 of the bar 60 is the wheel 36 and, specifically, a hub 84 of the wheel 36 sandwiched between front and rear plates 86,88, with the plates 86,88 and hub 84 all retained on the front end 74 of the bar 60 by another end nut 90. The hub 84 (and therewith a tire 92 of the wheel 36 mounted thereon) thereby is maintained fixed against movement relative to the bar 60. As a result of the support of the wheel 36 on the bar 60, the wheel 36 travels between a first position within the recess 34 and a second position outside of the recess 34 remote from the mount 62 when the bar 60 travels between the retracted and extended positions, respectively.

The hub 84 is coaxial with the bar 60 and includes apertures 94 arranged in corresponding orientation to the studs 66 of the mounting plate 64. The studs 66 extend perpendicularly from the mounting plate 64 through the apertures 94 in the hub 84 to inhibit rotation of the hub 84 when the bar 60 is in the retracted position. The hub 84 further includes fasteners comprising lugs 96 permanently carried thereon by springs 98. The lugs 96 engage the studs 66 when the bar (60) is in the retracted position, and the air wrench 46 is used to loosen and tighten the lugs 96 on the studs 66 when removing the wheel 36 from and returning the wheel 36 to the mount 62. When returned to the mount 62, tightening of the lugs 96 with the air wrench 46 thereby secures the hub 84 (and wheel 36) to the mount 62 and against movement relative to the showcase 22.

As will be apparent from the detailed description of the preferred embodiment 20, the hub 84 is supported such that an axis 100 thereof remains in fixed orientation relative to the mount 62 when the bar 60 is in the retracted and extended positions and when the bar 60 linearly slides between these two positions.

Figure 13:
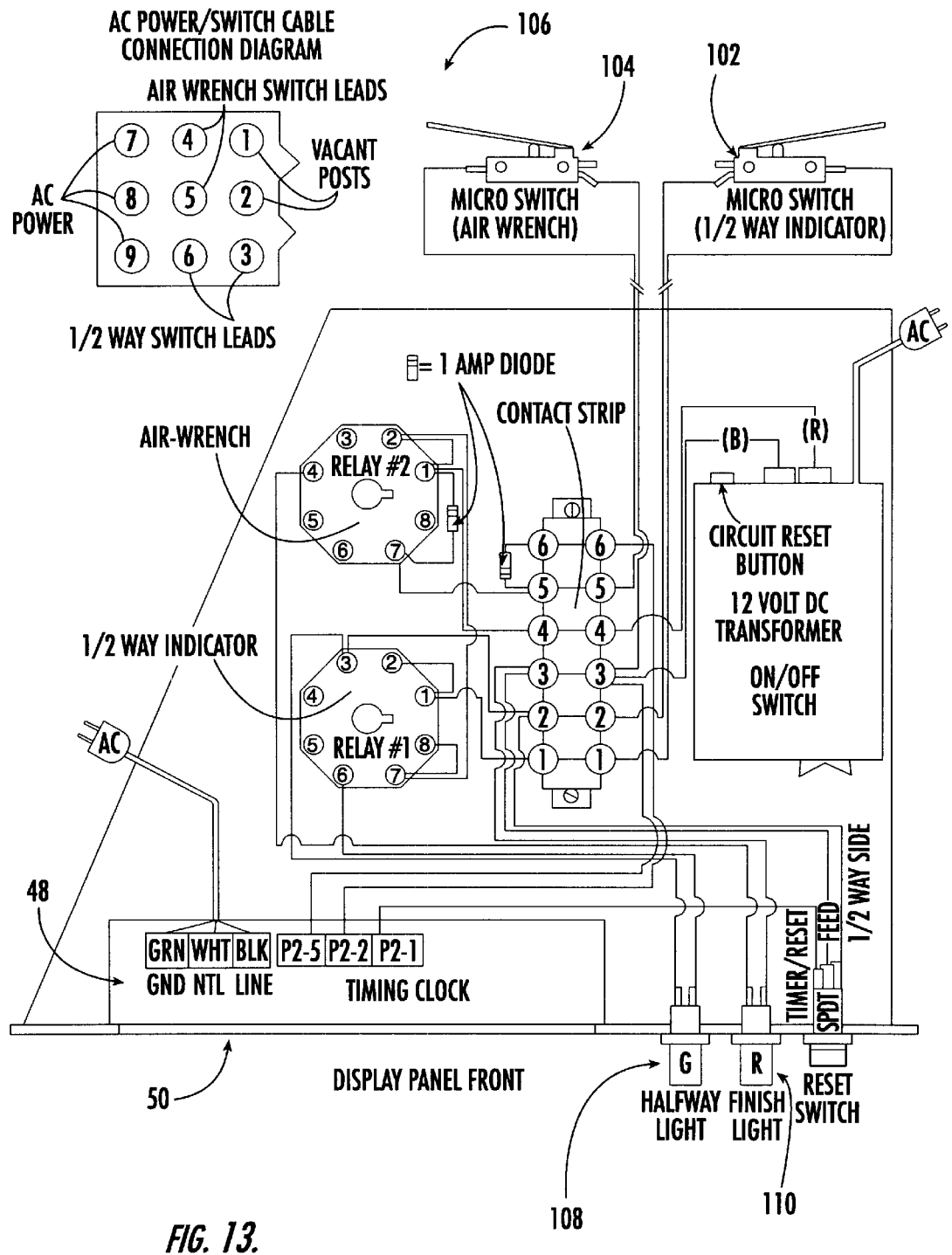
FIG. 13 is a schematic diagram of the preferred electrical system of the apparatus of FIG. 1.

The showcase 22 further includes a limit switch 102 that is tripped by the trigger plate 80 carried on the bar 60 when it moves toward the extended position, and a limit switch 104 that is tripped when the air wrench 46 is stored in the recess 44. Each limit switch 102,104 is connected as shown in FIG. 13 illustrating schematically the electrical control system 106 of the preferred embodiment 20. The electrical control system 106 is utilized in the simulation of the present invention as will now be described in detail with reference to FIGS. 6–12.

Figure 2:
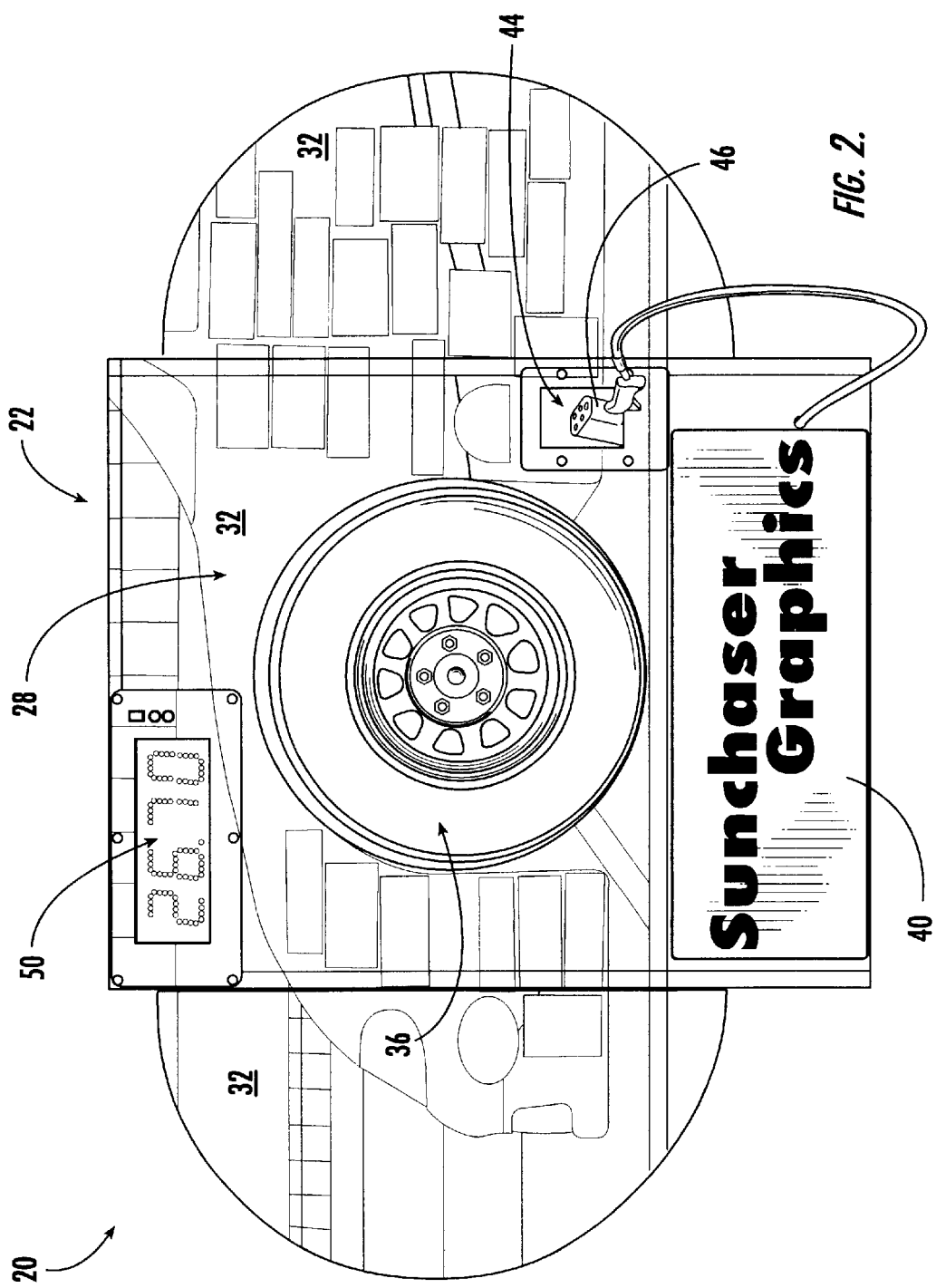
FIG. 2 is an elevational view of a front of the apparatus of FIG. 1.
Figure 3:
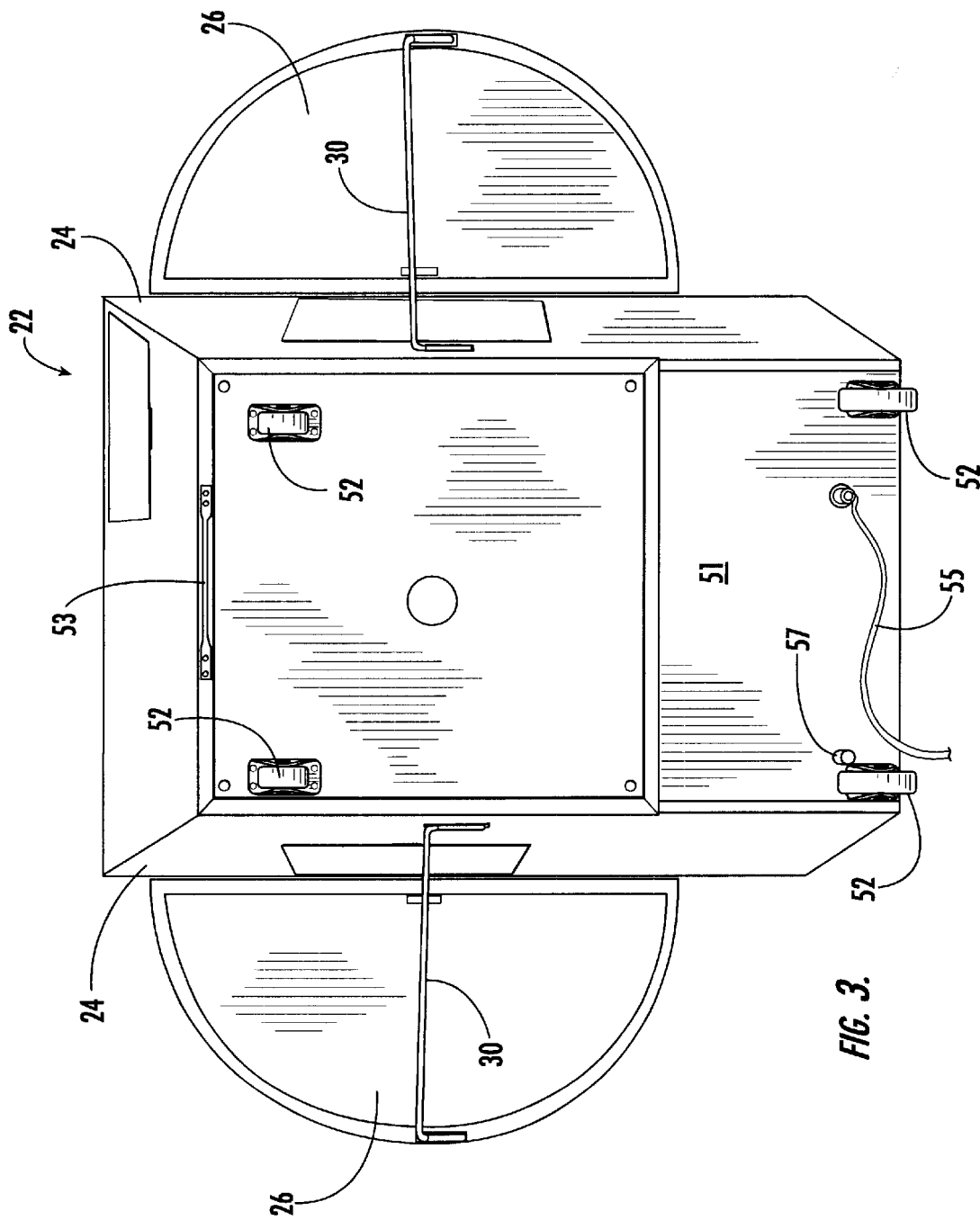
FIG. 3 is an elevational view of a rear of the apparatus of FIG. 1.
Figure 4:
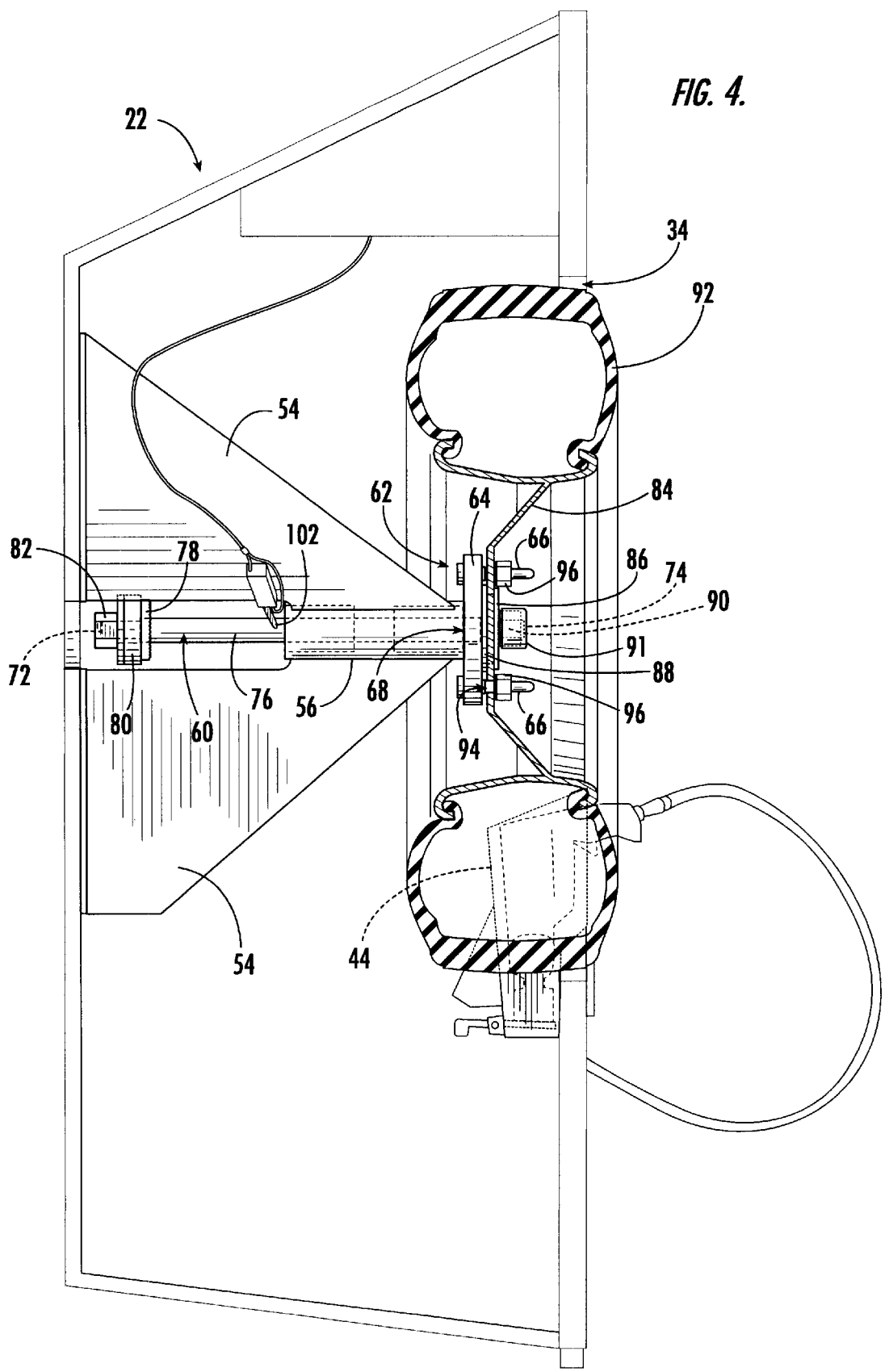
FIG. 4 is an elevational view in partial cross-section of the apparatus of FIG. 1 taken along the line 4—4 in FIG. 1.
Figure 5:
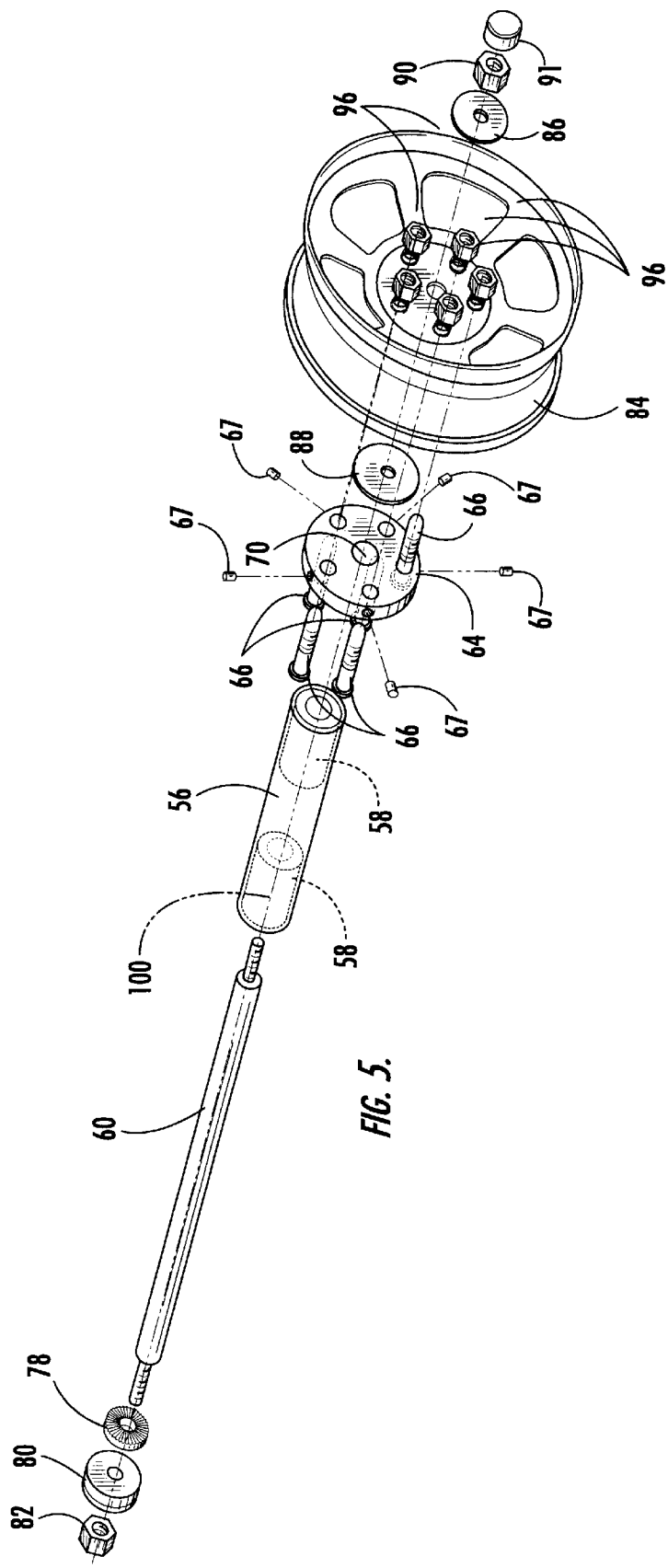
FIG. 5 is an exploded view of part of the apparatus of FIG. 4.
Figure 7:
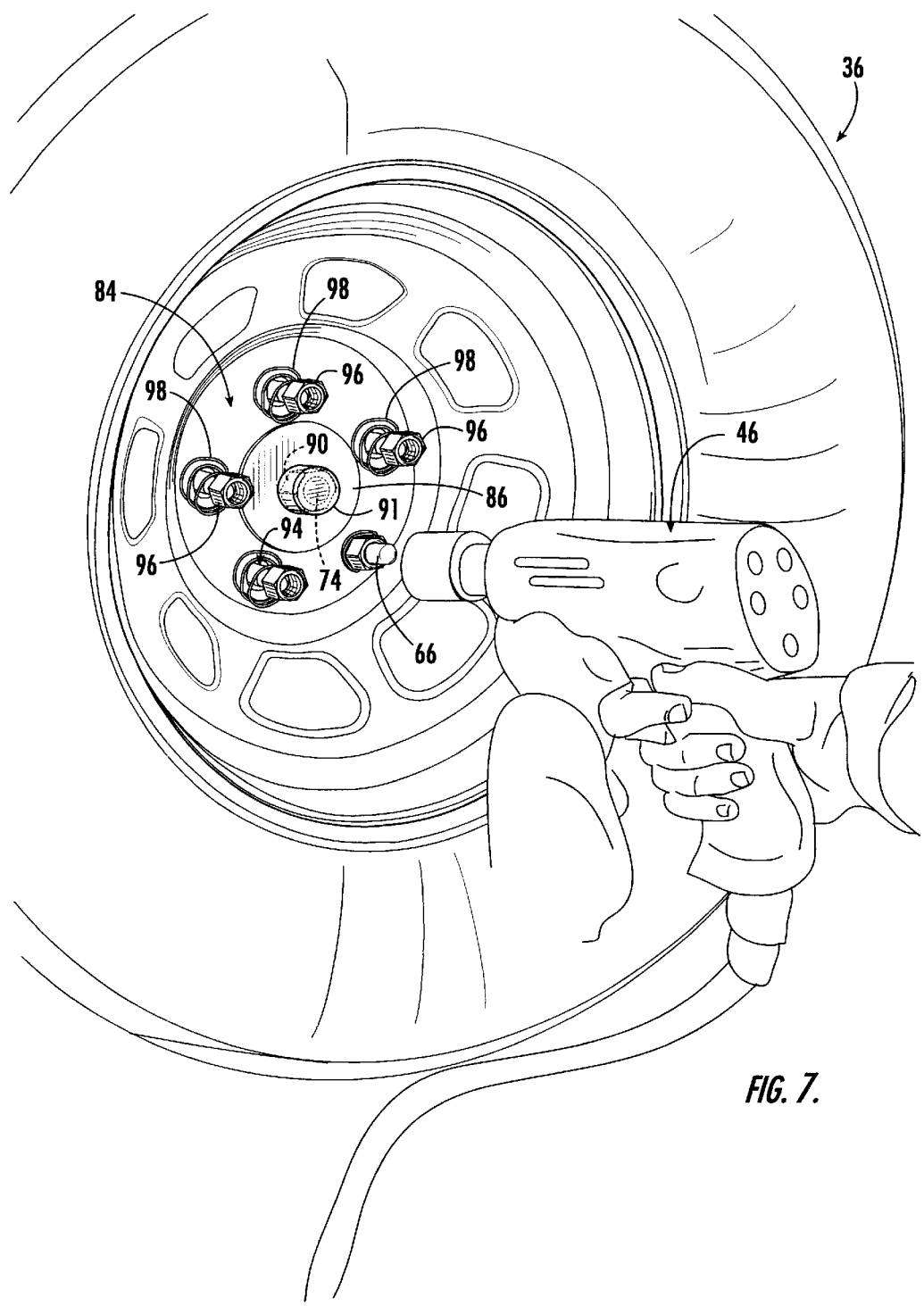
FIG. 7 is a perspective view of another part of the apparatus of FIG. 1 illustrating another step in the simulation of the present invention.

The simulation begins with the showcase 22 disposed as shown in FIG. 2. In the first step, illustrated in FIG. 6, the air wrench 46 is withdrawn from the recess 44. Withdrawal of the air wrench 46 trips the limit switch 104 which, in turn, initiates the chronograph 48 through the electrical control system 106. In the next step, the air wrench 46 is used to loosen the lugs 96 on the studs 66, as illustrated in FIG. 7. To facilitate the simulation, the lugs 96 are retained on the hub 84 through springs 98 as described above. Such arrangement is conventional and, for example, is representative of the arrangement disclosed in U.S. Pat. No. 5,042,880 to Garuti et al. Furthermore, to protect injury to the participant by the end nut 90, the preferred embodiment 20 includes a plastic cap 91 placed over the end nut 90.

Figure 8:
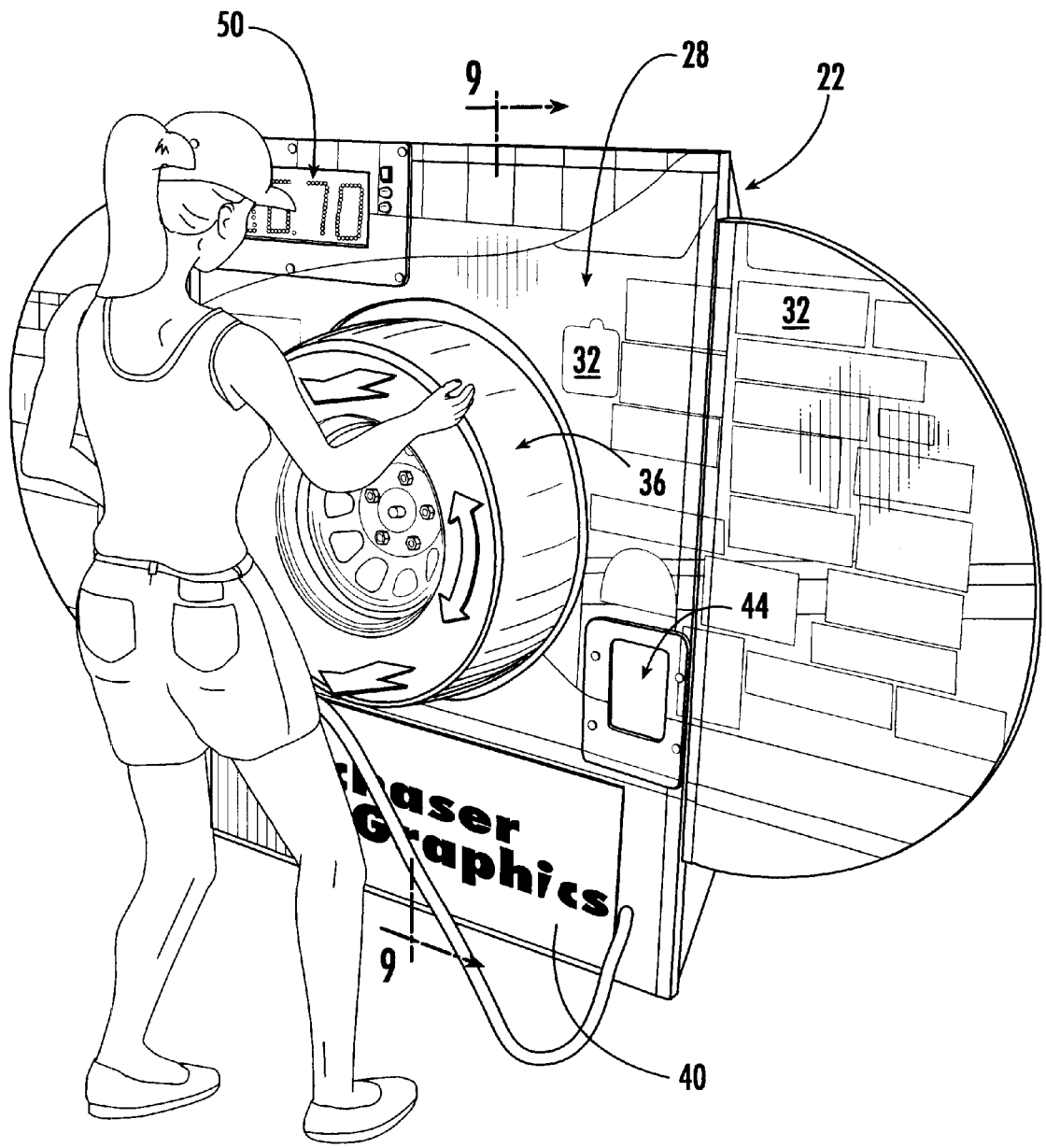
FIG. 8 is a perspective view of the apparatus of FIG. 1 illustrating a third step in the simulation of the present invention.
Figure 9:
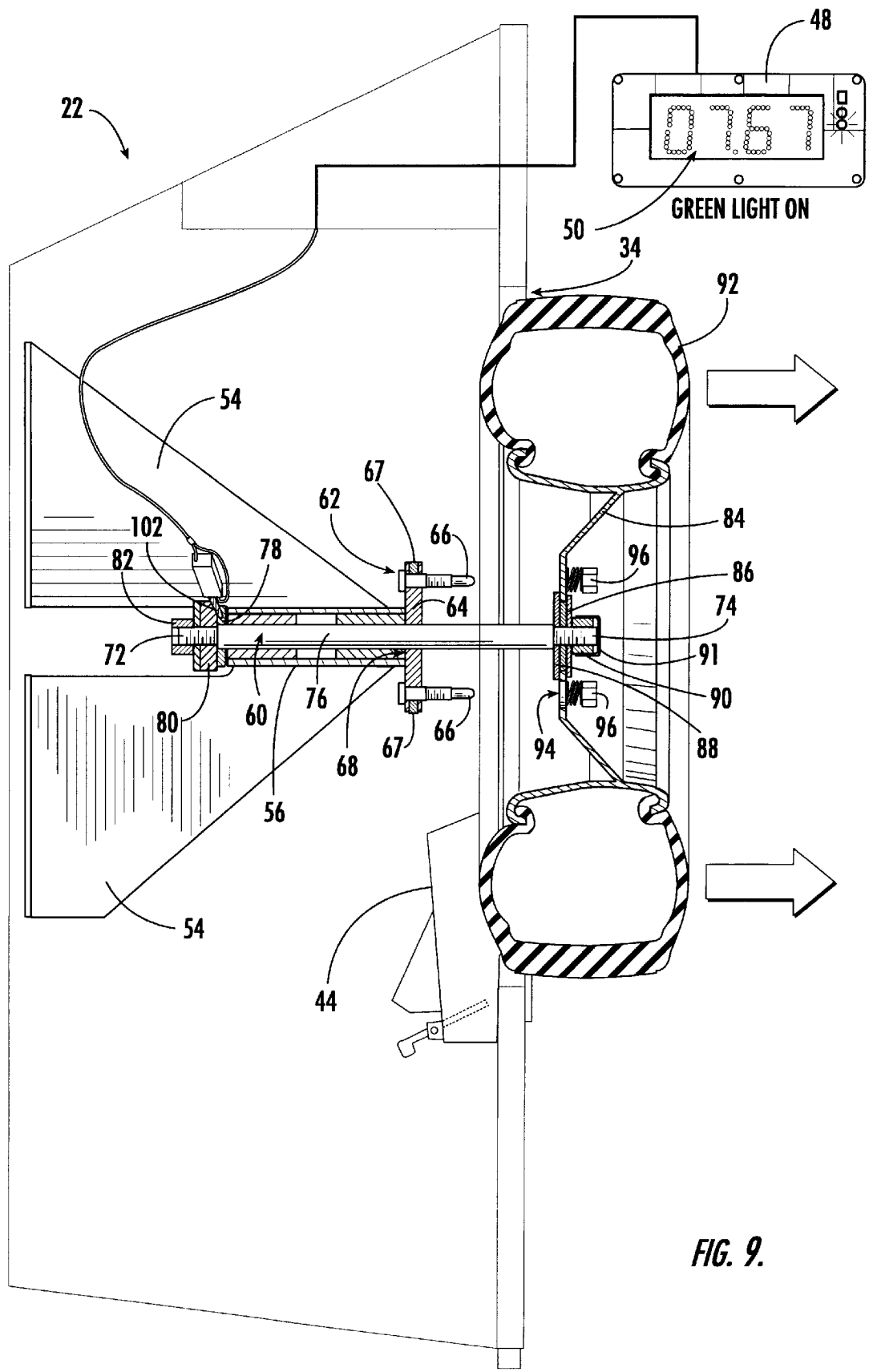
FIG. 9 is an elevational view of a side of the apparatus of FIG. 1 in partial cross-section illustrating again the third step of FIG. 8.

In the third step, as illustrated in both FIGS. 8 and 9, the wheel 36 is linearly displaced along its axis 100 away from the mount 62 such that it extends outside of the recess 34 of the showcase 22 at a location remote from the mount 62. In accordance with the present invention, however, the wheel 36 remains supported on the bar 60 and, accordingly, the person taking part in the simulation as a member of a fictitious pit crew actually does not support the wheel 36 as would otherwise be the case in the real situation.

Upon the moving of the bar 60 from the retracted position toward the extended position, the trigger plate 80 supported on the bar 60 trips limit switch 102 which, through the electrical control system 106, activates a green light 108 located on the chronograph display 50. The green light 108 signifies that the participant has actually extended the wheel 36 outwardly from the showcase 22 and the bar 60 toward the extended position. The rubber bumper 78 also supported on the bar 60 similarly engages the bearing housing 56 and cushions the engagement of the bar 60 while limiting further sliding of the bar 60 away from the mount 62. At this point, the wheel 36 can be rotated a full revolution.

Figure 10:
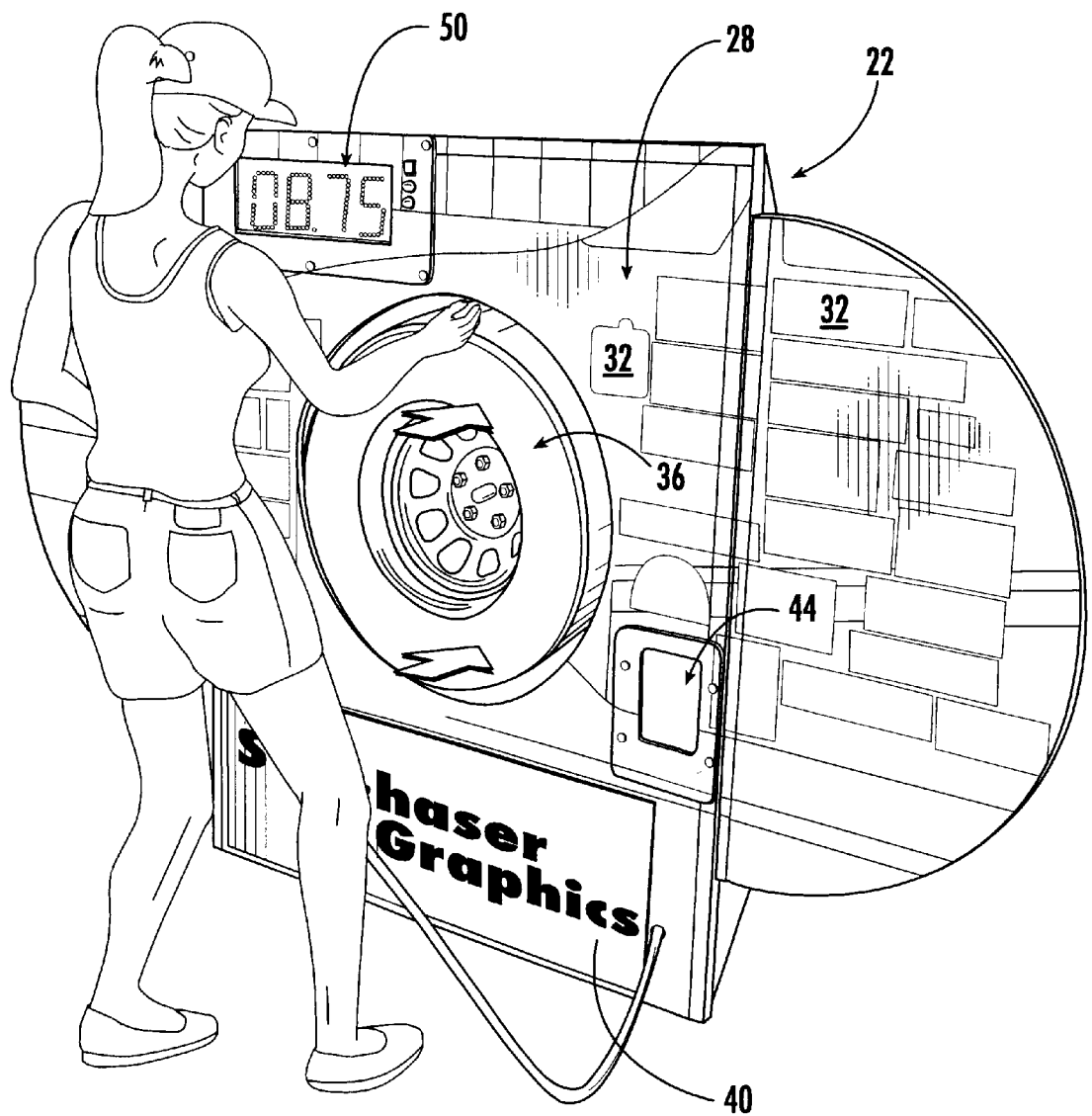
FIG. 10 is a perspective view of the apparatus of FIG. 1 illustrating a fourth step in the simulation of the present invention.
Figure 11:
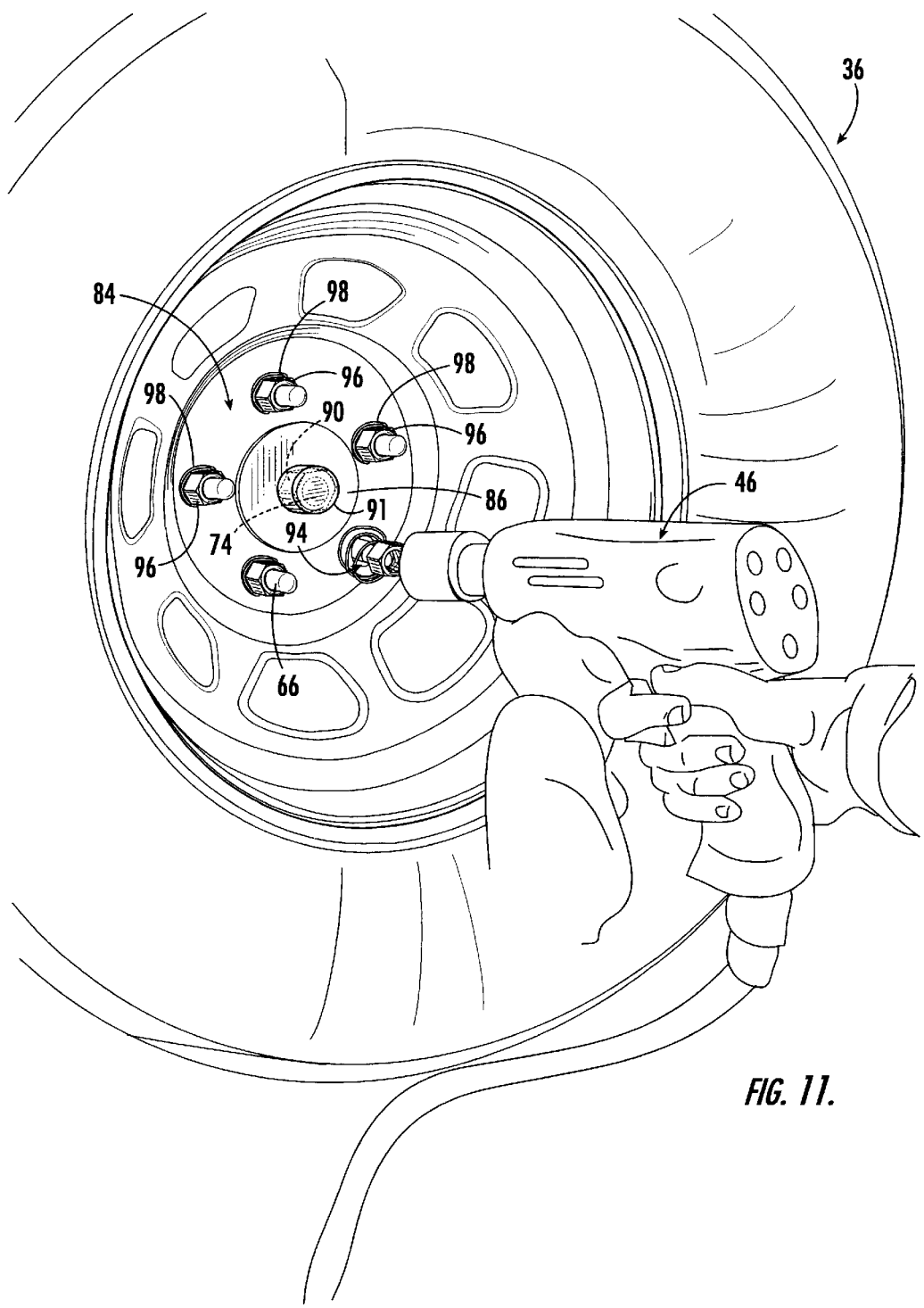
FIG. 11 is a view similar to that of FIG. 8 illustrating a fifth step in the simulation of the present invention.
Figure 12:
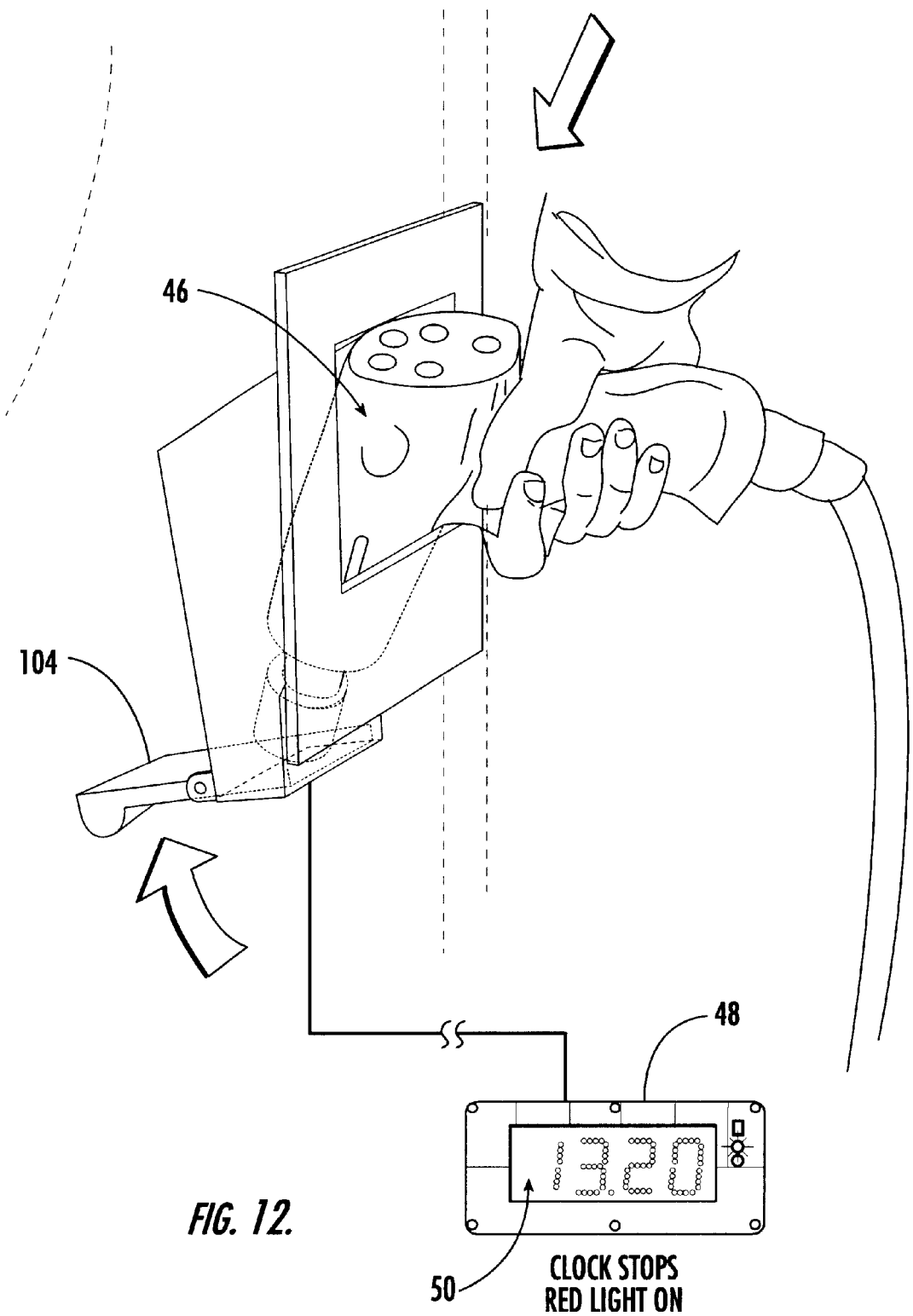
FIG. 12 is a view similar to that of FIG. 7 illustrating a sixth step in the simulation of the present invention.

To finish the simulation, the wheel 36 is then displaced back toward the mount 62, as illustrated in FIG. 10. The bar 60 is returned to the retracted position and the hub 84 once again returns to the mount 62 with the hub 84 being realigned with the mounting plate 64. Next, the air wrench 46 is again used this time to tighten the lugs 96 onto the studs 66 extending from the mounting plate 64 through the hub 84 to secure the wheel 36, as illustrated in FIG. 11. When all lugs 96 have been secured, the air wrench 46 is returned to the recess 44 for storage and again trips the limit switch 104 which, in turn, causes the chronograph 48 to stop and activates a red light 110 located on the chronograph display 50. The red light 110 signifies the completion of the simulation and the chronograph display 50 then shows the total time elapsed during the simulation.

In view of the aforesaid written description of the present invention, it will be readily understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Thus, while the present invention has been described herein in detail in relation to one or more preferred embodiments, this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof. Thus, for instance, it is contemplated within the present invention that the hub be disposed to rotate about the bar while supported thereon.

What is claimed is:

1. An apparatus for performing a wheel-changing simulation, comprising:
   (a) a mount,
   (b) a support connected to said mount and that moves relative to said mount between first and second positions, and
   (c) a wheel hub non-removably retained on said support such that said hub is located adjacent to said mount for securement thereto when said support is in the first position thereof, and is located remote from said mount when said support is in the second position thereof.

2. The apparatus of claim 1, wherein said mount comprises a planar mounting plate and said support comprises an arm that slides in a direction perpendicular to said mounting plate.

3. The apparatus of claim 1, wherein said support comprises an elongate bar having an end on which said hub is affixed.

4. The apparatus of claim 3, wherein said elongate bar and said hub are disposed in coaxial relation.

5. The apparatus of claim 1, wherein said mount abuts said hub to inhibit rotation of said hub when said support is in the first position.

6. The apparatus of claim 5, wherein said mount comprises a mounting plate having studs extending therefrom through openings defined in said hub.

7. The apparatus of claim 1, wherein said hub rotates relative to said mount when said support is in the second position.

8. The apparatus of claim 7, wherein said hub rotates on said support when said support is in the second position.

9. The apparatus of claim 7, wherein said hub is fixed against movement relative to said support.

10. The apparatus of claim 1, further comprising a fastener carried on said hub and that engages said mount for securement of said hub thereto when said support is in the first position.

11. The apparatus of claim 10, wherein said fastener is connected to and thereby carried on said hub by a spring.

12. The apparatus of claim 1, further comprising a tire mounted onto said wheel hub.

13. The apparatus of claim 1, further comprising a bearing housing in which said support is slidably retained.

14. The apparatus of claim 13, wherein said mount is affixed to said bearing housing.

15. The apparatus of claim 1, wherein said mount defines an opening through which said support extends.

16. The apparatus of claim 1, further comprising a showcase to which said mount and said support are affixed.

17. The apparatus of claim 16, wherein said showcase includes a front wall defining a recess in which said hub is located when said support is in the first position.

18. The apparatus of claim 16, further comprising a wrench and wherein said showcase includes a recess in which said wrench is stored.

19. The apparatus of claim 18, wherein said showcase further comprises a switch that is tripped when said wrench is stored in said recess.

20. The apparatus of claim 16, wherein said showcase further comprises a switch that is tripped when said support moves toward the second position.

21. The apparatus of claim 20, wherein said switch is tripped by said support.

22. The apparatus of claim 16, wherein said showcase further comprises a stop clock.

23. The apparatus of claim 16, wherein said showcase includes rollers affixed to a wall thereof for mobility of said showcase.

24. A method for simulating a wheel-changing operation on a racecar by a pit crewman, comprising the steps of:

(a) unfastening a wheel hub from a mount, (b) removing the hub from the mount, (c) returning the hub to the mount, (d) refastening the hub to the mount, and (e) constantly supporting the hub non-removably throughout each said step by attaching the hub to a support that is connected to and moves relative to the mount.

25. A method for simulating a wheel-changing operation on a racecar by a pit crewman, comprising the steps of:

(a) unfastening a wheel hub from a mount, (b) removing the hub from the mount by displacing the hub along an axis thereof, (c) returning the hub to the mount, (d) refastening the hub to the mount, and (e) constantly supporting the hub such that the axis remains in fixed orientation and non-removably relative to the mount throughout each said step.

26. The method of claim 25, wherein said step of supporting the hub comprises attaching the hub to a support that is connected to and moves relative to the mount.

27. The method of claim 26, further comprising rotating the hub about the axis after removing the tire from the mount and before returning the tire to the mount, and supporting the hub such that the axis remains in fixed orientation relative to the mount during said step of rotating the hub.

\* \* \* \* \*